United States Patent [19]
Petrie

[11] 3,735,973
[45] May 29, 1973

[54] PIPE SUPPORT

[76] Inventor: William E. Petrie, c/o Economy Design Inc. 5003 West 159th St., Tinley Park, Ill. 60452

[22] Filed: Oct. 15, 1971

[21] Appl. No.: 189,638

Related U.S. Application Data

[63] Continuation-in-part of Ser. No. 834,669, June 19, 1969, abandoned.

[52] U.S. Cl....................................269/296, 248/55
[51] Int. Cl..............................B23q 3/00, F16l 3/00
[58] Field of Search...................269/289.1, 296, 298, 269/299; 248/55

[56] References Cited

UNITED STATES PATENTS 1,056,028  3/1913  Kehm.....................................248/55
2,653,347  9/1953  Diekman............................269/289.1

FOREIGN PATENTS OR APPLICATIONS 119,409  2/1958  U.S.S.R..............................269/296

Primary Examiner—Francis S. Husar
Attorney—Hofgren, Wegner, Allen, Stellman & McCord

[57] ABSTRACT

A pipe support assembly for holding pipe to be worked upon including a generally inverted V-shaped base with the top of the base defined by the apex thereof. Plural openings are formed in the top on an axis inclined relative to the intended horizontal positioning of the base. A pair of tubes are provided, being of a size and shape to be received in the openings at an angular orientation to the horizontal during intended use, each tube having roller elements for rotatably supporting the pipe to be worked upon.

9 Claims, 6 Drawing Figures

Patented May 29, 1973
3,735,973
2 Sheets-Sheet 1
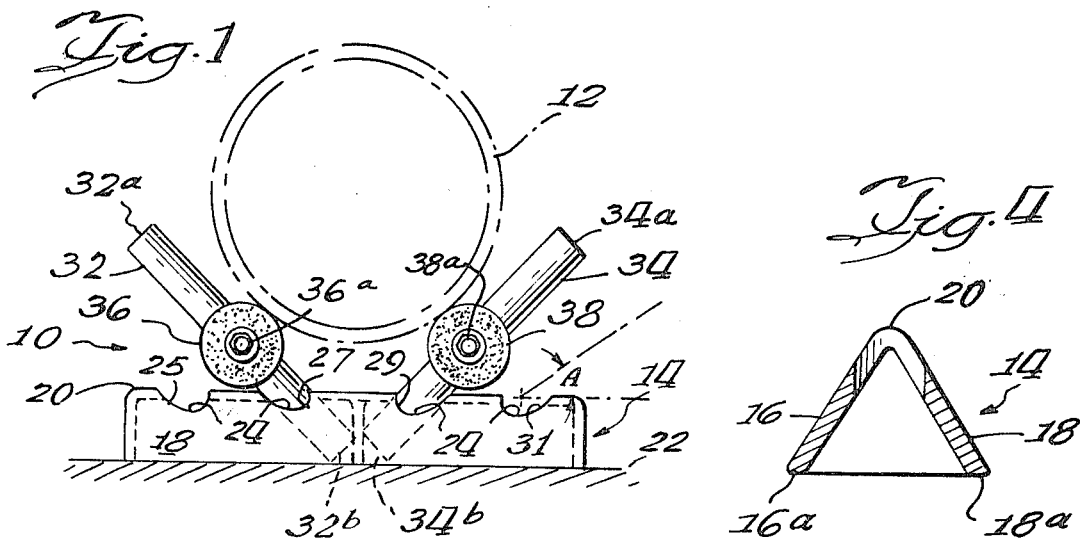
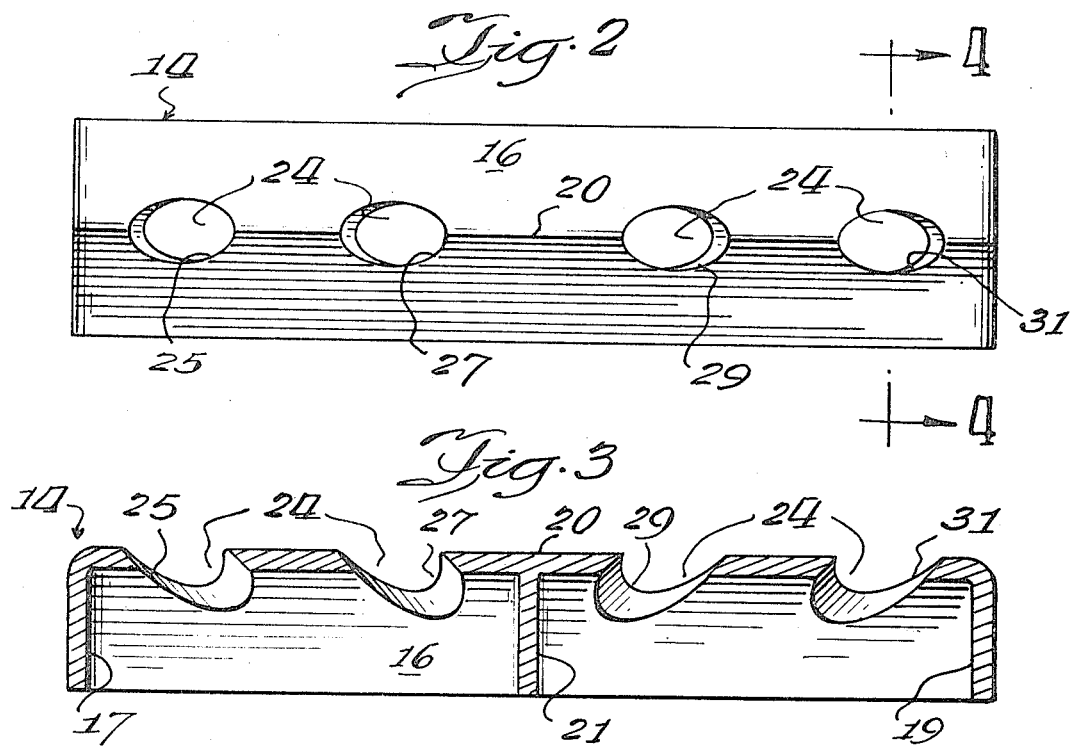
INVENTOR
William E. Petrie
BY Hofgren, Wegner, Allen, Stellman & McCord
ATTORNEYS

PIPE SUPPORT

CROSS-REFERENCE

This application is a continuation-in-part of my co-pending application Ser. No. 834,669, filed June 19, 1969 and entitled "Pipe Support" and now abandoned.

BACKGROUND OF THE INVENTION

My U.S. Pat. No. 3,313,505 discloses a collapsible stand which can be used by a plumber or pipe fitter for a temporary support for a length of pipe or similar work piece while it is being worked upon. While that structure is less bulky than previously known prior art structures and rather compact and easily carried about, there has been a continuing need and desire for more compact and simpler pipe support structures which may be more easily transported and set up for use and particularly adapted for use in situations where the stand must be carried about to the location of the pipe.

SUMMARY OF THE INVENTION

This invention is directed to the provision of a new and improved pipe support assembly. More particularly, the best mode currently contemplated by me for carrying out the invention includes the provision of a base member of a generally inverted V-shape with the apex of the V constituting the top of the base. It is intended that plural openings would be formed in the top of the base with the axis of the openings being inclined relative to the bottom of the base. It is further intended that the openings would be so shaped so as to receive a pipe support element in generally nestable association therewith to hold the same at an axis inclined relative to the intended horizontal disposition of the base. The pipe support elements would be provided with rollers, preferably in pairs with one on either side of the element, with the rollers being mounted for rotation about an axis transverse to the horizontal axis of the pipe support elements and located closer to one end of the pipe support elements than the other end thereof. To permit use of the support assembly with unusually small diameter pipes, at least one end of each of the pipe support elements is provided with an offset notch having a base transverse to the axis of rotation of the rollers so that the ends of the support elements may overlap each other within the notches to permit the rollers to be located very close together to support small diameter pipes.

DESCRIPTION OF THE DRAWINGS

FIG. 1 is a side elevational view showing the pipe support assembly of this invention;

FIG. 2 is a top plan view of the pipe support assembly shown in FIG. 1;

FIG. 3 is a vertical section view of the pipe support assembly shown in FIG. 1;

FIG. 4 is a section view taken generally along the lines 4—4 of FIG. 1;

DESCRIPTION OF THE PREFERRED EMBODIMENTS

Figure 5:
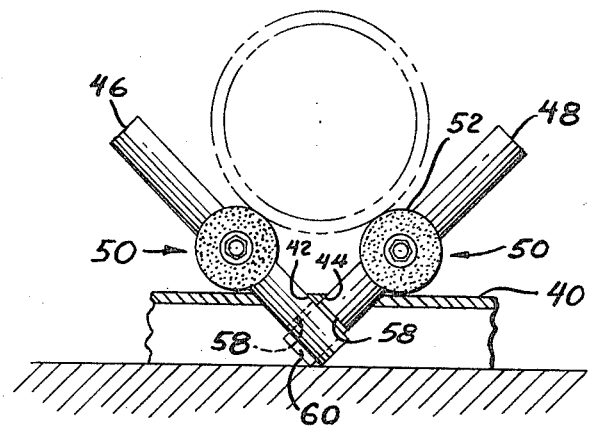
FIG. 5 is a fragmentary vertical section of a modified embodiment of the invention.

The pipe support assembly 10 of this invention is intended for use in holding a pipe 12 while the pipe is to be worked upon by a workman.

The pipe support assembly 10 includes a base, generally designated 14. Preferably, the base has an inverted V-shaped configuration as defined by the divergent legs 16 and 18 which meet at the apex 20. In normal orientation of the base 14, it is intended that the legs 16 and 18 would describe an upper portion with the free ends 16a and 18a of each of the legs defining the bottom thereof and the apex 20 defining the extreme top. Thus, as best seen in FIG. 1, edges of the ends 16a and 18a of each of the legs 16 and 18 would rest upon a supporting surface 22 during normal use. To add strength to assembly 10, end panels 17 and 19 may be provided as well as central web 21, spanning legs 16 and 18.

The pipe support assembly includes a plurality of connection elements 24 for work piece support means. Preferably, receiving means 24 comprises the inner periphery or bounds of apertures or openings such as 25, 27, 29, 31 through the apex 20 and into each of the leg portions 16 and 18 of the base 14. It is desired that the openings 25, 27, 29, 31 would be formed so that the axis of the openings describes an angle "A" relative to the intended disposition of the base 14 on a supporting surface 22. Preferably, this acute angle "A" would be about 50° to the horizontal and its complementary obtuse angle would be about 130° to the horizontal.

The openings 25, 27, 29, 31 are intended for receiving the work piece supporting means 32 and 34 in a removable, nestable relationship therewith. In the illustrated embodiment, each of the work piece support means 32 and 34 is made of tubular stock and has a length defined between the opposite ends 32a, 32b and 34a, 34b.

Each of the support means 32 and 34 includes a roller assembly or roller means 36 and 38 intermediate the ends thereof. Roller means 36 and 38 includes a pair of generally circular cylindrical rollers fixed to a pin 36a and 38a, respectively, which is rotatably mounted through each of the support elements 32 and 34, respectively. By this arrangement, each of the pairs of rollers 36 and 38 is rotatable with respect to each of the support means 32 and 34 and positioned for generally tangential engagement with a portion of the periphery of the pipe 12 so that the pipe may be easily rotated about its axis during the performance of a work function thereupon.

Preferably, the roller means 36 and 38 are connected to the support means 32 and 34 so that the roller means are closer to one end, such as 32a and 34a, respectively, than they are to the other end, such as 32b and 34b. This feature, coupled with the provision of more than two openings, such as the openings 25, 27, 29, 31 makes the pipe support assembly of this invention adaptable for use with a wide range of pipes of different diameters.

In intended use for smaller diameter pipes, the support means 32 and 34 should be inserted into the closely adjacent openings 27 and 29 with the ends 32a and 34a engaging the support surface 22 so that the rollers 36 and 38 would be positioned very closely adjacent to each other and therefore capable of supporting pipes of very small diameters. To accommodate pipes of slightly larger diameters, the support means 34 could be removed from opening 29 and inserted through opening 31, with the end 34a still adjacent supporting surface 22. To accommodate even larger diameter pipes, the support means 32 and 34 could be inverted so that ends 32b and 34b are inserted through openings 27 and opening 29 or 31. It can be seen that other combinations of the orientation of the support means 32 and 34 relative to openings 25 through 31 will allow the pipe support assembly of this invention to be used with a great variety of pipes of different diameters. It is to be appreciated that the provision of even more openings, such as another opening or two to the left of opening 26 as seen in FIG. 2, and the provision of one or two extra support means 32 and 34 with roller means positioned closer to one end, could all be reasonable modifications of the present invention which would add an even greater range of use of the pipe support assembly. Further, the connection elements, instead of being the bounds of openings 27 through 31, could be stub-like elements.

Figure 6:
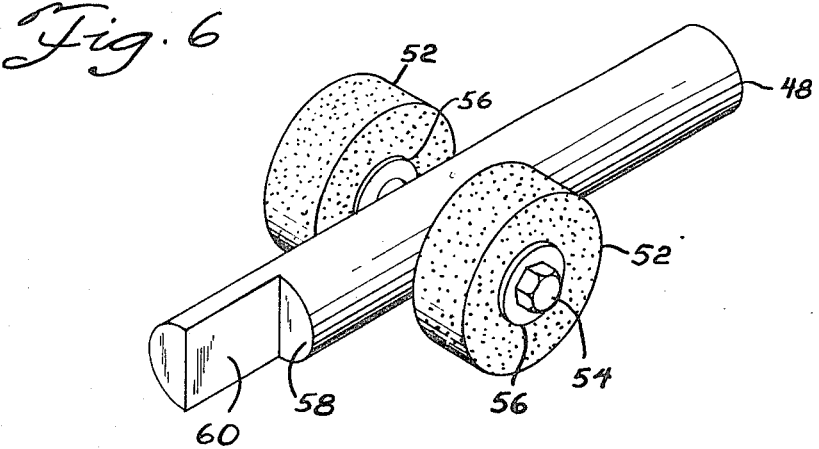
FIG. 6 is a perspective view of a pipe support element made according to the modified embodiment.

A modified and preferred form of the invention is illustrated in FIGS. 5 and 6 and is particularly desirable in that the same is susceptible to use in supporting pipes with the same facility as the embodiment illustrated in FIGS. 1–4 but in addition has increased capability in terms of supporting small diameter pipes. More particularly, the same includes a base 40 which may be in all respects identical to the base 14 except that no provision is made for a central web corresponding to the web 21. That is, the web 21 is omitted. In addition, the innermost apertures 42 and 44 in the base 40 corresponding approximately to the apertures 27 and 29 in the base 14 may be spaced a lesser distance than the latter.

Rod-like pipe support elements 46 and 48 formed of tubes or solid stacks and approximately functionally equivalent to pipe support elements 32 and 34 may be received in the apertures 40 and 44 respectively. As with the pipe support elements 32 and 34, each of the pipe support elements 46 and 48 include roller means, generally designated 50, and each comprised of a pair of generally cylindrical rollers 52 journaled to their respective support element by a pivot pin in the form of a bolt 54 including washers 56 or the like. And, similarly to the location of the roller means 36 and 38 in the previously described embodiment, the rollers 52 may be located closer to one end of the corresponding element 46 or 48.

Each of the support elements 46 and 48, at least at its end nearest to the pivot pin 54 mounting the rollers 52, includes a semi-cylindrical recess 58 defining a base 60 extending approximately through the midpoint of the support element and transverse to the axis of rotation of the rollers 52 provided by the bolt 54.

As can be easily seen from a comparison of FIGS. 1 and 5, the provision of the notches 58 permits overlapping of the ends of the pipe support elements 46 and 48 received within the base 40 so that the roller means 50 may be located more closely together than is the case with the roller means 36 and 38 in the embodiment illustrated in FIG. 1 since the notches 58 complement each other and allow the illustrated overlap. As a result, substantially smaller pipes having diameters less than 75 percent of the smallest size pipe that can be satisfactorily supported by the apparatus illustrated in FIG. 1 can be supported with the apparatus illustrated in FIGS. 5 and 6. Moreover, the same accomplishes the improved result without offsetting or skewing the plane of support for the pipe with respect to the direction of elongation of the base.

I claim:

1. A work piece support assembly comprising: a base having a bottom for engagement with a generally flat supporting surface and a top; means defining a plurality of work piece support means connection elements in the top formed on an axis extending at an acute angle relative to a midportion of the base and the bottom thereof, and elongated work piece support means engageable with said connection elements for diverging outwardly thereof, said connection elements being the bounds of apertures formed in the upper portion of the base, the apertures being formed on an axis inclined relative to the bottom of the base and the intended supporting surface therefor, an end of each said work piece support means being generally axially and nestably received in a corresponding aperture for divergent extension upwardly and outwardly from the base.

2. The support assembly of claim 1 wherein the work piece support means includes a support element having opposed ends and roller means mounted on said support means closer to one end thereof than the other end.

3. The support assembly of claim 1 wherein the work piece support means are generally tubular and the base is a generally inverted V-shaped structure with said apertures being formed in the apex of the base and in adjacent upper portions thereof.

4. The support assembly of claim 1 wherein the base is provided with plural connection elements in excess of the intended work piece support means to be connected thereto.

5. The support assembly of claim 4 wherein the work piece support means includes an elongated support element having opposed ends and roller means mounted on said support means closer to one end thereof than the other end.

6. The support assembly of claim 1 wherein each of said work piece support means includes at at least one end thereof, a relieved formation adapted to overlap within the base, a corresponding relieved formation on the other work piece support means.

7. The support assembly of claim 6 wherein each said work piece support means includes roller means mounted thereon closer to said one end thereof than the other end.

8. The support assembly of claim 7 wherein said relieved portion is defined by a notch having a base transverse to the axis of rotation of said roller means.

9. A work piece support assembly comprising: a base having a bottom for engagement with a generally flat supporting surface and a top; means defining a plurality of work piece support means connection elements in the top formed on an axis extending at an acute angle relative to a midportion of the base and the bottom thereof, and work piece support means engageable with said connection elements for diverging outwardly thereof, said base being provided with a plurality of said connection elements in excess of the intended work piece support means to be connected thereto, said connection elements comprising the bounds of apertures in the base formed on an axis inclined relative to the bottom of the base and the intended supporting surface therefor, the work piece support means being generally nestably received in the apertures for divergent extension outwardly from the base and being generally tubular, the base being a generally inverted V-shaped configuration.

* * * * *